US009148690B2

(12) United States Patent
Nijim et al.

(10) Patent No.: US 9,148,690 B2
(45) Date of Patent: Sep. 29, 2015

(54) MULTI-ROOM RECORDER

(75) Inventors: Yousef Wasef Nijim, Roswell, GA (US); Lisa A. Pickelsimer, Atlanta, GA (US); Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 310 days.

(21) Appl. No.: 12/815,458

(22) Filed: Jun. 15, 2010

(65) Prior Publication Data
US 2011/0305441 A1 Dec. 15, 2011

(51) Int. Cl.
| H04N 5/91 | (2006.01) |
| H04N 5/76 | (2006.01) |
| H04N 9/80 | (2006.01) |
| H04N 21/433 | (2011.01) |
| H04N 5/782 | (2006.01) |
| H04N 21/436 | (2011.01) |
| H04N 21/462 | (2011.01) |
| H04N 21/472 | (2011.01) |

(52) U.S. Cl.
CPC ........... *H04N 21/4334* (2013.01); *H04N 5/782* (2013.01); *H04N 21/43615* (2013.01); *H04N 21/462* (2013.01); *H04N 21/47214* (2013.01)

(58) Field of Classification Search
CPC .................... H04N 5/76; H04N 5/80
USPC ..................................... 386/291, 83
See application file for complete search history.

(56) References Cited

U.S. PATENT DOCUMENTS

| 2002/0174430 | A1* | 11/2002 | Ellis et al. | 725/46 |
| 2004/0068739 | A1* | 4/2004 | Russ et al. | 725/39 |
| 2005/0198682 | A1* | 9/2005 | Wright | 725/96 |
| 2006/0215990 | A1* | 9/2006 | Proebstel | 386/83 |
| 2007/0079340 | A1* | 4/2007 | McEnroe | 725/78 |
| 2007/0101185 | A1* | 5/2007 | Ostrowka | 714/6 |
| 2009/0016694 | A1* | 1/2009 | Yamamoto | 386/83 |
| 2009/0217332 | A1* | 8/2009 | Hindle et al. | 725/109 |
| 2011/0026904 | A1* | 2/2011 | McAuley | 386/297 |
| 2011/0162009 | A1* | 6/2011 | Adimatyam et al. | 725/40 |

* cited by examiner

*Primary Examiner* — Thai Tran
*Assistant Examiner* — Nien-Ru Yang
(74) *Attorney, Agent, or Firm* — Merchant & Gould P.C.

(57) ABSTRACT

Scheduling may be provided. First, a first request to record a first program content may be received. The first request may be received from a first device and initiated by a first user. Next, in response to the received first request, a first entry may be added to a scheduling list. The first entry may correspond to the first request. Then, the first program content may be recorded according to the first entry in the scheduling list. In response to recording the first program content, a first indication may then be added to a recording list. The first indication may indicate that the first program content has been recorded.

20 Claims, 3 Drawing Sheets

MULTI-ROOM RECORDER

BACKGROUND

Cable television is a system of providing television to consumers via signals transmitted to a television set through fixed optical fibers or coaxial cables. A set-top box (STB) may be used to convert the cable television signals to ones usable by the television set. A digital video recorder (DVR) may be used in conjunction with a STB. The DVR may record video in a digital format to a disk drive, USB flash drive, memory card, or other memory medium within the DVR.

SUMMARY OF THE INVENTION

Scheduling may be provided. First, a first request to record a first program content may be received. The first request may be received from a first device and initiated by a first user. Next, in response to the received first request, a first entry may be added to a scheduling list. The first entry may correspond to the first request. Then, the first program content may be recorded according to the first entry in the scheduling list. In response to recording the first program content, a first indication may then be added to a recording list. The first indication may indicate that the first program content has been recorded.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
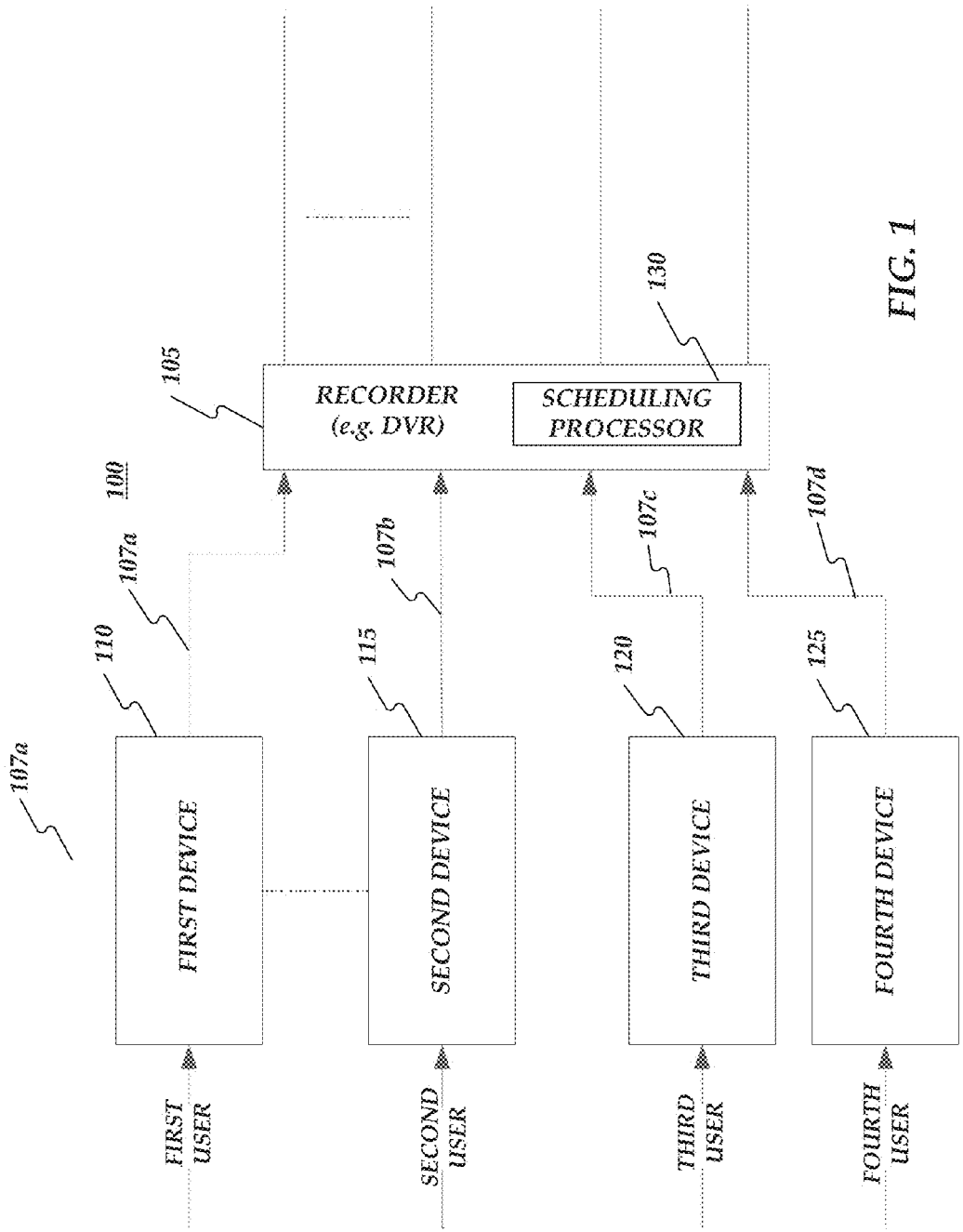
FIG. 1 is a block diagram of a multi-room recording environment including a scheduling processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, users may record program content from devices (e.g. STBs.) Conventional DVRs, however, do not distinguish which set-top requested a recording nor do conventional DVRs assign a recording to a client. Consistent with embodiments of the invention, in a recording list, a user may see any personalization based on a device (e.g. STB) that requested the recording or the user who requested the recording. Consequently, with embodiments of the invention, users may know which device (e.g. STB) requested a recording in a multi-room recording environment. Additionally, embodiments of the invention may allow the user to know who in the household requested a particular recording.

Identifying and naming a device (e.g. STB) that requested a recording in a multi-room recording environment may allow a recorder (e.g. DVR) to pass proper messaging between the devices (e.g. STBs) and the recorder (e.g. DVR). Embodiments of the invention may enhance the user experience in the multi-room recording environment. For example, a user may request a recording from a device (e.g. STB) in a master bedroom. Consistent with embodiments of the invention, a recorder (e.g. DVR) may know who (e.g. the user) requested the recording, may schedule the recording, and may pass back proper messaging about the recording to the device (e.g. STB) in the master bedroom from which the recording request was made.

Along with a device (e.g. STB) name passed to the recorder (e.g. a scheduling processor in a DVR), embodiments of the invention may pass a name of a user in the household who requested a recording. This may allow the recorder (e.g. DVR) to personalize messaging back to the user on a user level. Consequently, when a user is navigating through a scheduling list (before the recoding takes place) or a recording list (after the recording has taken place), either of these lists may show which user recorded the program content and from which device (e.g. STB, mobile telephone, computer, mobile device, portable device, etc.) the recording was requested.

FIG. 1 is a block diagram of a multi-room recording environment 100, located, for example, in a house. As shown in FIG. 1, multi-room recording environment 100 may include a recorder 105 and a plurality of devices connected to recorder 105. The plurality of devices may comprise a first device 110, a second device 115, a third device 120, and a fourth device 125. Recorder 105 may comprise a DVR and may include a scheduling processor 130 as described in greater detail below. First device 110 may comprise a first STB located in a first room (e.g. master bedroom) of a house. Second device 115 may comprise a second STB located in a second room of the house. Third device 120 may comprise a computer connected to recorder 105 through, but not limited to, a network (e.g. the Internet) a wired or wireless. Fourth device 125 may comprise a portable device such as a mobile phone connected to recorder 105 through, but not limited to, any one or more of a network (e.g. the Internet), a wire, a wireless network, or a cellular network. Notwithstanding, first device 110, second device 115, third device 120, and fourth device 125 may be connected to recorder 105 respectively through connections 107a, 107b, 107c, and 107c in any manner.

Figure 2:
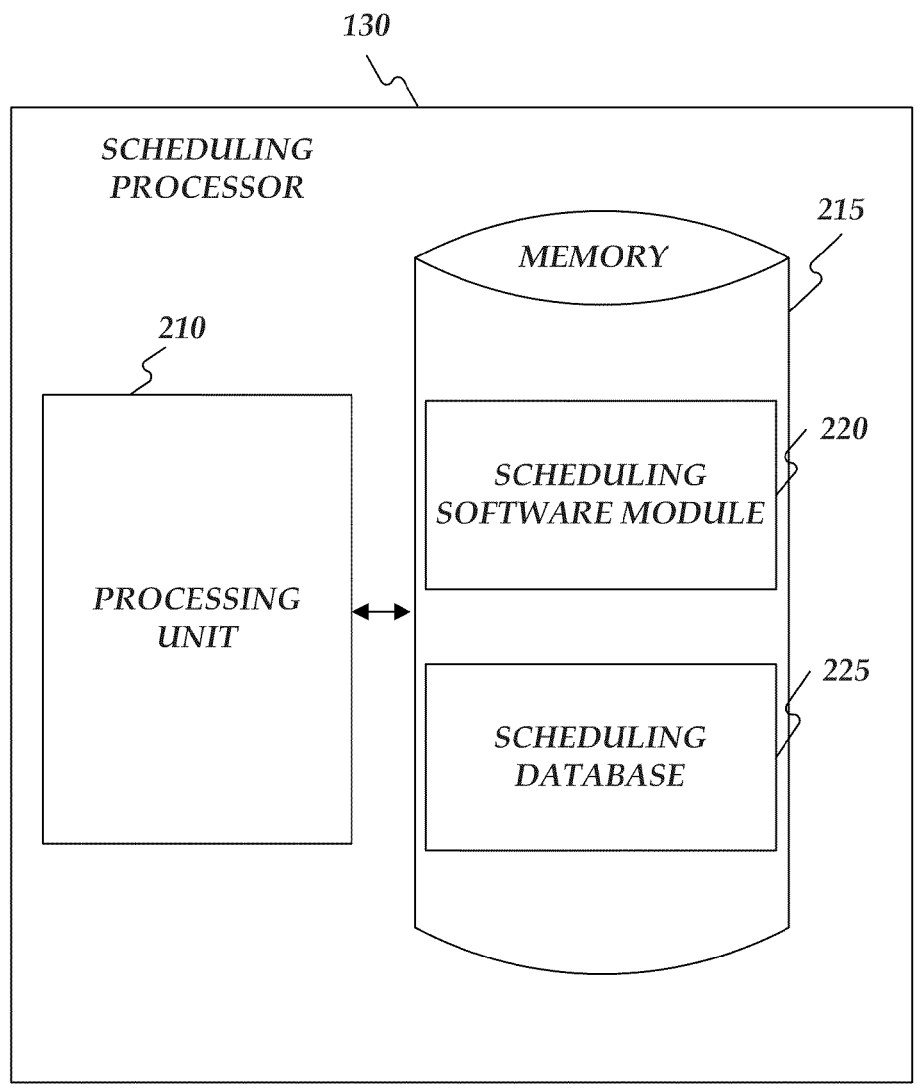
FIG. 2 is a block diagram of the scheduling processor.

FIG. 2 shows scheduling processor 130 of FIG. 1 in more detail. As shown in FIG. 2, scheduling processor 130 may include a processing unit 210 and a memory unit 215. Memory 215 may include a scheduling software module 220 and a scheduling database 225. While executing on processing unit 210, scheduling software module 220 may perform processes for providing scheduling, including, for example, one or more stages included in method 300 described below with respect to FIG. 3. Furthermore, any of scheduling software module 220 and scheduling database 225 may be executed on or reside in any element shown in FIG. 1.

Scheduling processor 130 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
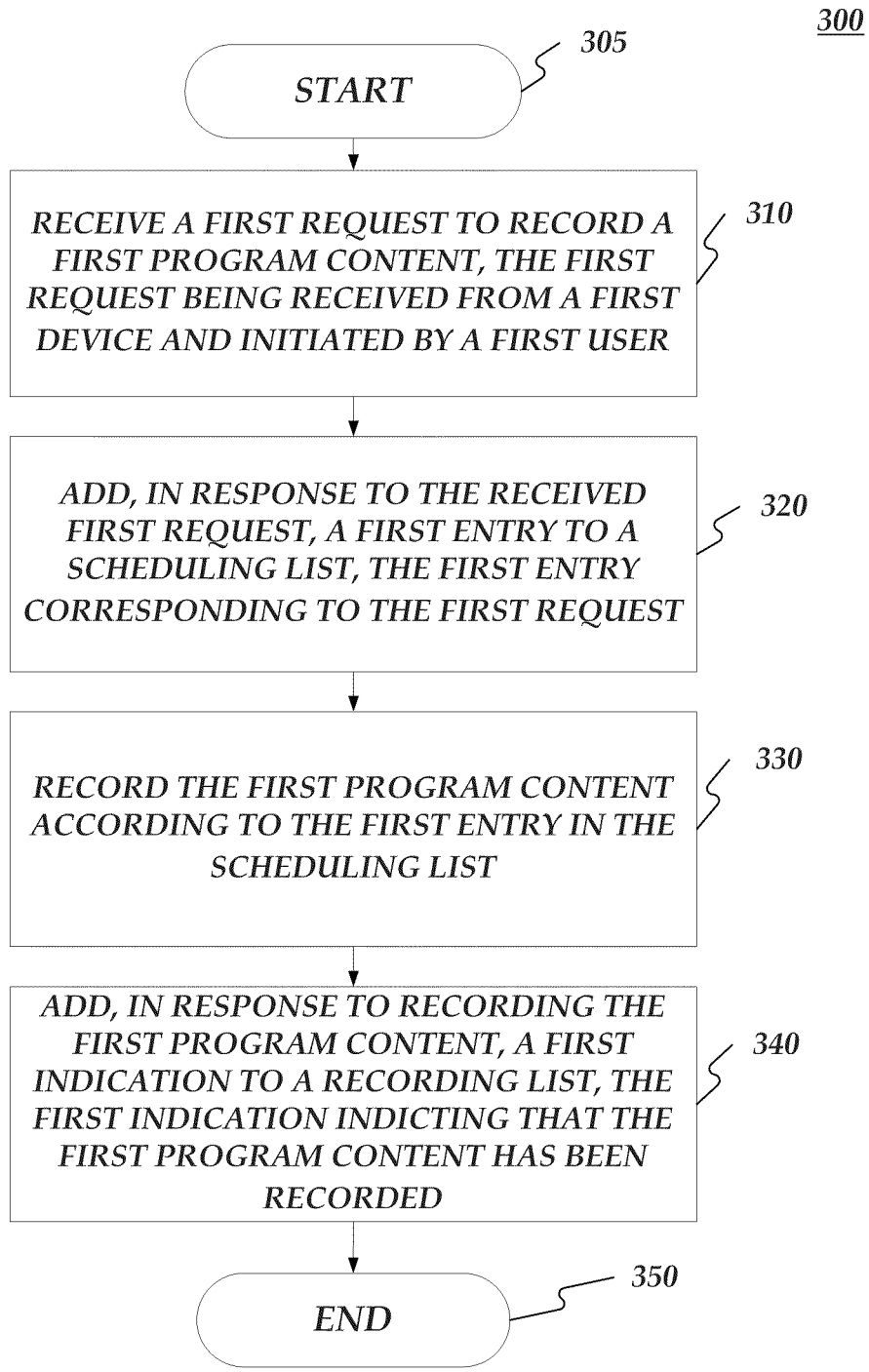
FIG. 3 is a flow chart of a method for providing scheduling.

FIG. 3 is a flow chart setting forth the general stages involved in a method 300 consistent with an embodiment of the invention for providing scheduling. Method 300 may be implemented using scheduling processor 125 as described in more detail above with respect to FIG. 2. Ways to implement the stages of method 300 will be described in greater detail below.

Method 300 may begin at starting block 305 and proceed to stage 310 where scheduling processor 130 may receive a first request to record a first program content. The first program content may comprise any content received by first device 110. For example, the first program content may comprise, but not limited to, a television program, a video-on-demand program, or any content receivable by a set-top box.

The first request may be received from first device 110 and initiated by a first user. For example, any one of the plurality of devices connected to recorder 105 may send the first request to record the first program content to recorder 105. The first user may be operating first device 110 in a room of a home (e.g. master bedroom). The first user, while operating first device 110, may decide to record content being received or to be received in the future by first device 110. In order to record the content, the first user may initiate the first request that may identify the first user, the content to be recorded, and the start and stop times of the recording. First device 110 may attach to the first request an identifier identify first device 110. Once created, first device 110 may transmit the first request to recorder 105. Recorder 105 (e.g. scheduling processor 130) may send back to first device 110 a confirmation confirming the receipt of the first request. Recorder 105 may know which of the plurality of devices to send the confirmation to by the identifier. The confirmation may be presented to the first user who may view the confirmation.

The first request is not limited to being created and transmitted from a STB. For example, the first user may create and transmit the first request from a personal computer (e.g. third device 120) or a portable device such as a mobile telephone (e.g. fourth device 125.) The personal computer or portable device may be connected to recorder 105 via the internet or any network. The personal computer or portable device may be connected to recorder 105 via a wired or wireless connection.

From stage 310, where scheduling processor 130 may receive the first request, method 300 may advance to stage 320 where scheduling processor 130 may add, in response to the received first request, a first entry to a scheduling list. The first entry may correspond to the first request. For example, scheduling processor 130 may maintain the scheduling list in scheduling database 225. The scheduling list may indicate which programs are to be recorded by recorder 105, the name of a user who requested a particular program be recorded, and a particular device from which the request to record the corresponding program came. Specifically, in response to the received first request, scheduling processor 130 may cause the scheduling list to include the first entry naming the first program content, the times for which the first program content is to be recorded, and naming first device 110 from which the request to record the first program content came.

Recorder 105 may include a plurality of tuners. If prior to adding the first entry to the scheduling list it is determined that all of the plurality of tuners are to be busy during the times for which the first program content is to be recorded, scheduling processor 130 may not add the first entry to the scheduling list. In this case, scheduling processor 130 may return a message to first device 110 that recorder 105 will not have a tuner available during the times for which the first program content is to be recorded. In other words, the first entry to the scheduling list may be added in response to determining that a tuner is not busy during a time for which the first program content is to be recorded.

Once scheduling processor 130 adds the first entry to the scheduling list in stage 320, method 300 may continue to stage 330 where scheduling processor 130 may record the first program content according to the first entry in the scheduling list. For example, scheduling processor 130 may periodically query the scheduling list to determine if a program should be recorded. When the time has come to record the first programming content according to the scheduling list (or any program listed in the scheduling list,) recorder 105 may record the first programming content.

After scheduling processor 130 records the first program content in stage 330, method 300 may proceed to stage 340 where scheduling processor 130 may add, in response to recording the first program content, a first indication to a recording list. The first indication may indicate that the first program content has been recorded. For example, the first indication in the recording list may indicate that the first program content has been recorded by recorder 105, the name of the first user who requested the first program content be recorded, and the name of first device 110 from which the request to record the first program content came.

Consistent with embodiments of the invention, users using any of the plurality of devices in multi-room recording environment 100 may request the scheduling list and/or the recording list. In response, the requesting device may receive and display the scheduling list and/or the recording list. The user may request content from the recording list to be displayed on the device that the user is using.

Moreover, the recording list and the first program content may be uploaded to a device when the device connects with the digital video recorder. For example, the recording list and the first program content may be uploaded to device 125 (e.g. a mobile telephone, a computer, etc.) when device 125 connects with recorder 105 through, for example, a wireless network. Device 125 may only receive program content requested through device 125 or it may receive all program content recorded by recorder 105. Once scheduling processor 130 adds the first indication to the recording list in stage 340, method 300 may then end at stage 350.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing scheduling, the method comprising:

receiving a first request to record a first program content from a first device, wherein receiving the first request comprises receiving a name of a first user initiating the first request and an identifier associated with the first device;

sending a confirmation notification confirming the receipt of the first request to the first device, wherein sending the confirmation notification comprises sending, in the confirmation notification, a personalized message to the first user;

determining, upon the receipt of the first request, whether at least one tuner is available for recording during a time for which the first program content is to be recorded;

adding, in response to the at least one tuner being available, a first entry to a scheduling list, the first entry corresponding to the first request, wherein adding the first entry to the scheduling list comprises adding, along with the first entry, the name of the first user and an identity of the first device in the scheduling list;

recording the first program content according to the first entry in the scheduling list;

receiving a connection from the first device;

verifying that an identifier of the connected first device corresponds to the identifier of the first device that issued the first request to record the first program content; and uploading, upon verification of the identifier, the first program content and a recording list to the first device, the recording list comprising an indication of completion of the recording of the first program content, the name of the first user, and a name of the first device.

2. The method of claim 1, further comprising:

receiving a recording list request;

providing the recording list in response to the recording list request;

receiving a selection of the first program content in response to providing the recording list; and providing the first program content in response to receiving the received selection of the first program content.

3. The method of claim 1, further comprising:

receiving a scheduling list request; and providing the scheduling list in response to the scheduling list request.

4. The method of claim 1, further comprising, receiving a second request to record a second program content, the second request being received from a second device and initiated by a second user;

adding, in response to the received second request, a second entry to the scheduling list, the second entry corresponding to the second request;

recording the second program content according to the second entry in the scheduling list; and adding, in response to recording the second program content, a second indication to a recording list, the second indication indicating that the second program content has been recorded.

5. The method of claim 1, wherein receiving the first request to record the first program content comprises receiving the first request to record the first program content, the first request being received from the first device and initiated by the first user wherein the first device comprises one of the following: a set-top box, a personal computer, and a portable device.

6. The method of claim 1, wherein receiving the first request comprises receiving the first request by a digital video recorder.

7. The method of claim 6, wherein receiving the first request to record the first program content comprises receiving the first request to record the first program content, the first request being received from the first device and initiated by the first user wherein the first device comprises one of a plurality of devices connected to the digital video recorder.

8. The method of claim 7, wherein receiving the first request to record the first program content comprises receiving the first request to record the first program content, the first request being received from the first device and initiated by the first user wherein the first device comprises a portable device wherein the method further comprises uploading the recording list and the first program content to the portable device when the portable device connects with the digital video recorder.

9. A non-transitory computer-readable medium which stores a set of instructions which when executed performs a method for providing scheduling, the method executed by the set of instructions comprising:
receiving, at a digital video recorder, a first request to record a first program content from a first device, wherein receiving the first request from the first device comprises receiving a name of a first user initiating the request and an identifier associated with the first device;
providing a confirmation, based on the identifier, to the first user at the first device in response to receiving the first request to record the first program content, wherein providing the confirmation comprises sending a confirmation notification comprising a personalized message to the first user;
determining, upon the receipt of the first request, whether at least one tuner is available for recording during a time for which the first program content is to be recorded;
adding, in response to the determination of availability of the at least one tuner, a first entry to a scheduling list, the first entry corresponding to the first request wherein the first entry indicates an identity of the first device and the name of the first user;
recording the first program content;
adding, in response to recording the first program content, a first indication to a recording list, the first indication indicating that the first program content has been recorded and which user requested the recording of the first program content, wherein the first indication is personalized to the first user that requested the recording;
receiving a recording list request;
providing the recording list in response to the recording list request;
receiving a selection of the first program content in response to providing the recording list;
verifying that an identifier associated with a device requesting the recording list corresponds to the identifier associated with the first device; and
uploading the first program content and a recording list to the first device in response to receiving the received selection of the first program content, the recording list comprising an indication of completion of the recording of the first program content, a name of the first user, and a name of the first device.

10. The non-transitory computer-readable medium of claim 9, further comprising:
receiving a scheduling list request; and
providing the scheduling list in response to the scheduling list request.

11. The non-transitory computer-readable medium of claim 9, further comprising:
receiving a second request to record a second program content, the second request being received from a second device and initiated by a second user;
adding, in response to the received second request, a second entry to the scheduling list, the second entry corresponding to the second request;
recording the second program content according to the second entry in the scheduling list; and
adding, in response to recording the second program content, a second indication to a recording list, the second indication indicting that the second program content has been recorded.

12. The non-transitory computer-readable medium of claim 9, wherein receiving the first request to record the first program content comprises receiving the first request to record the first program content, the first request being received from the first device and initiated by the first user wherein the first device comprises one of a plurality of devices connected to the digital video recorder.

13. The non-transitory computer-readable medium of claim 9, wherein receiving the first request to record the first program content comprises receiving the first request to record the first program content, the first request being received from the first device and initiated by the first user wherein the first device comprises a mobile telephone wherein the method further comprises uploading the recording list and the first program content to the mobile telephone when the mobile telephone connects with the digital video recorder.

14. A system for providing scheduling, the system comprising:
a memory storage; and
a processing unit coupled to the memory storage, wherein the processing unit is operative to:
receive, at a digital video recorder, a first request to record a first program content, the first request being received from a first device and initiated by a first user, wherein the received request comprises a name of the first user initiating the first request and an identifier associated with the first device;
provide a confirmation, based on the identifier, to the first user at the first device in response to receiving the first request to record the first program content, wherein the processor being configured to provide the confirmation comprises the processor being configured to provide, in the notification, a personalized message to the first user;
determine, upon the receipt of the first request, whether at least one tuner is available for recording during a time for which the first program content is to be recorded;
add, in response to the determination of availability of the at least one tuner, a first entry to a scheduling list, the first entry corresponding to the first request, wherein the first entry indicates an identity of the first device and the name of the first user;
record the first program content according to the first entry in the scheduling list;
add, in response to recording the first program content, a first indication to a recording list, the first indication indicting that the first program content has been recorded, wherein the first indication indicates the first device and the first user that requested the recording;
receive a recording list request;
provide the recording list in response to the recording list request;
receive a selection of the first program content in response to providing the recording list;

verifying that an identifier associated with a device requesting the recording list corresponds to the identifier associated with the first device;

upload the first program content and a recording list to the device requesting the recording list in response to receiving the received selection of the first program content, the recording list comprising an indication of completion of the recording of the first program content, a name of the first user, and a name of the first device;

receive a second request to record a second program content, the second request being received from a second device and initiated by a second user;

add, in response to the received second request, a second entry to the scheduling list, the second entry corresponding to the second request;

record the second program content according to the second entry in the scheduling list; and add, in response to recording the second program content, a second indication to a recording list, the second indication indicting that the second program content has been recorded, the second indication being provided in a manner such that a viewer of the second indication is enabled to ascertain that the first user requested the recording.

15. The method of claim 1, further comprising:

not adding, in response to the at least one tuner not being available, the first entry to the scheduling list, the first entry corresponding to the first request; and sending a message to the user, the message comprising non-availability of the recorder during the time indicated by the user.

16. The method of claim 1, wherein sending the confirmation notification comprises:

determining the identity of the first user device from the received identifier;

determining the name of the first user from the received request;

creating the personalized message to the first user based on the determined name; and sending the personalized message in the confirmation notification.

17. The method of claim 1, wherein receiving the first request from the first device comprises receiving the first request from the first device through the Internet.

18. The method of claim 1, wherein receiving the first request from the first device comprises receiving the first request from the first device through a wireless network.

19. The method of claim 1, wherein receiving the name of the first user initiating the request and the identifier associated with the first device comprises:

receiving a request from the first user to display a program guide on the first device;

receiving a selection of the first program displayed on the program guide for recording; and generating, by the first device, the first request in response to the received selection, wherein generating the first request comprises:

attaching, to the first request, the name of the first user requesting the recording, and attaching, to the first request, the identifier associated with the identity of the first device.

20. The method of claim 1, further comprising adding, in response to recording the first program content, a first indication to the recording list, the first indication indicting that the first program content has been recorded, wherein the first indication indicates the first device and the first user that requested the recording.

* * * * *